United States Patent [19]

Plante

[11] Patent Number: 5,439,265
[45] Date of Patent: Aug. 8, 1995

[54] SLING FOR POSITIONING A LARGE-DIAMETER, LIQUID-CONTAINING HOSE

[76] Inventor: Richard R. Plante, 18 W. Union St., Goffstown, N.H. 03045-1606

[21] Appl. No.: 166,559

[22] Filed: Dec. 14, 1993

[51] Int. Cl.⁶ .............................................. B65D 63/18
[52] U.S. Cl. ................................... 294/152; 294/156
[58] Field of Search ............... 294/74, 149, 152, 156, 294/165

[56] References Cited

U.S. PATENT DOCUMENTS

| | | |
|---|---|---|
| 1,355,888 | 10/1920 | Burlew . |
| 1,824,027 | 9/1931 | Lundquist ........................ 294/152 X |
| 1,916,793 | 7/1933 | Harper . |
| 2,486,827 | 11/1949 | Duncan ................................. 150/1.5 |
| 2,598,921 | 6/1952 | Knudsen ................................ 294/74 |
| 2,819,923 | 1/1958 | Anderson .............................. 294/74 |
| 3,211,489 | 10/1965 | Gill ..................................... 294/152 X |
| 3,352,590 | 11/1967 | Barthule .............................. 294/74 |
| 3,400,870 | 9/1968 | Di Vietri ............................. 244/58 |
| 3,555,417 | 1/1971 | Yorty .................................. 224/45 |
| 4,200,325 | 4/1980 | Johnson ............................... 294/74 |
| 4,492,399 | 1/1985 | Randen et al. ...................... 294/74 |
| 4,558,896 | 12/1985 | Farnworth . |
| 4,696,505 | 9/1987 | Shadoan . |
| 5,169,199 | 12/1992 | de Ruyter et al. ............... 294/74 X |

*Primary Examiner*—Dean Kramer
*Attorney, Agent, or Firm*—Hayes, Soloway, Hennessey, Grossman & Hage

[57] ABSTRACT

A sling for positioning a large-diameter hose (such as a fire hose) while the hose is under pressure is provided. The sling of the present invention comprises two handles having respective U-shaped sleeves for carrying a flexible, elongate, flat strap for carrying the hose. The strap has two ends looped through respective sleeves of the handles and secured to the strap to form two respective loops about the sleeves. The loops are dimensioned to permit rotation of the sleeves in the loops. The strap is dimensioned to have a length between the sleeves that is between about 95 and 160 percent of the height of the individual using the sling. Preferably, the length of the strap is about 133 percent the height of the individual using the sling. This dimensioning of the strap permits the individual using the sling to predominately employ the individual's leg muscles, rather than the individual's back muscles, to drag the hose. Thus, the present invention permits easy and rapid positioning of a large-diameter hose, while substantially decreasing risk of injury to the individual positioning the hose.

11 Claims, 6 Drawing Sheets

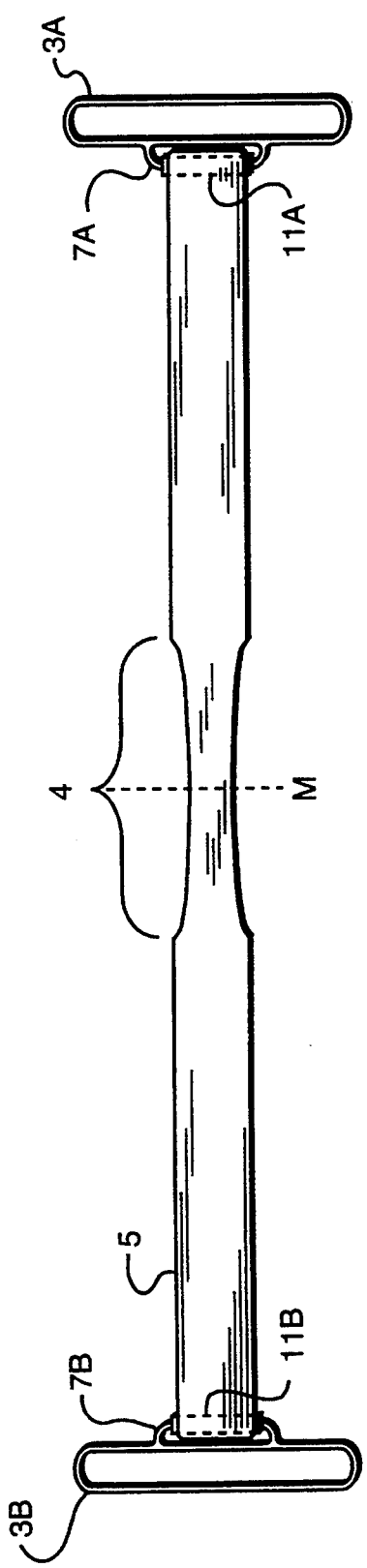

SLING FOR POSITIONING A LARGE-DIAMETER, LIQUID-CONTAINING HOSE

BACKGROUND OF THE INVENTION

1. Field of the Invention

The present invention relates generally to a sling for positioning a large diameter hose (such as a fire hose) while it is under pressure, and more specifically, to a sling for dragging a large diameter hose to permit rapid positioning or repositioning of same, while minimizing risk of injury to an individual using the sling.

2. Brief Description of Related Art

Deployment and positioning of a large-diameter hose (that is, a hose having a diameter typically between 3 and 6 inches) while it is under pressure (i.e., filled with liquid) can be a difficult and dangerous task. Typically, such hoses are used in emergency situations by a team of firefighters who must quickly move the hose into position in order to deliver water, fire-quenching foam, etc. to a fire site. Frequently, changes in circumstances at the site necessitate repositioning of the hose during the course of firefighting, while the hose is still under pressure. Given the stress of the firefighting environment, when such repositioning of the hose is required, firefighters sometimes do not take the time needed to exercise ergonomically proper lifting and carrying technique; they sometimes lift improperly—primarily using their back muscles rather than their leg muscles to lift the heavy, liquid-filled hose. This situation can lead to injury of firefighting personnel, which injury often includes painful, debilitating, lower back injuries.

A variety of devices exist in the prior art for hand-carrying cumbersome and oddly-shaped articles. Examples of such prior art devices include those disclosed in U.S. Pat. Nos. 1,355,888; 1,916,793; 2,486,827; 2,819,923; 3,400,870; 3,554,417; 4,558,896; and 4,696,505. However, the prior art neither appreciates nor solves the above-presented problems associated with rapid positioning of a large-diameter hose by a team of individuals under emergency conditions.

Objectives of the Invention

It is a general objective of the present invention to provide a device for positioning a large-diameter hose that overcomes the above-presented (and other) problems and drawbacks of the prior art. More specifically, it is an objective of the present invention to provide such a device that permits the hose to be positioned rapidly while minimizing risk of injury to an individual using the device.

SUMMARY OF THE INVENTION

Accordingly, the present invention provides a sling for positioning a large-diameter hose while it is under pressure. The sling of the present invention comprises two handles having respective U-shaped sleeves for carrying a flexible, elongate, flat strap for carrying the hose. The strap has two ends looped through respective sleeves of the handles and secured to the strap to form two respective loops about the sleeves. The loops are dimensioned to permit rotation of the sleeves in the loops. The strap is dimensioned to have a length between the sleeves that is between 95 and 160 percent of the height of the individual using the sling. Preferrably, the length of the strap is between about 120 and 140 percent and, more preferably, is about 133 percent of the height of the individual using the sling. It has been found that this dimensioning of the strap allows the individual using the sling to predominately employ the individual's leg muscles, rather than the individual's back muscles, to drag the hose. Thus, the present invention permits easy and rapid positioning and repositioning of a large-diameter hose, while substantially decreasing risk of injury to the individual positioning the hose.

Other features and advantages of the present invention will become apparent as the following detailed description proceeds and upon reference to the drawings, wherein like numerals depict like parts and in which:

BRIEF DESCRIPTION OF THE DRAWINGS

FIG. 1A is a top plan view of a variant of the preferred embodiment shown in FIG. 1;

Figure 1:
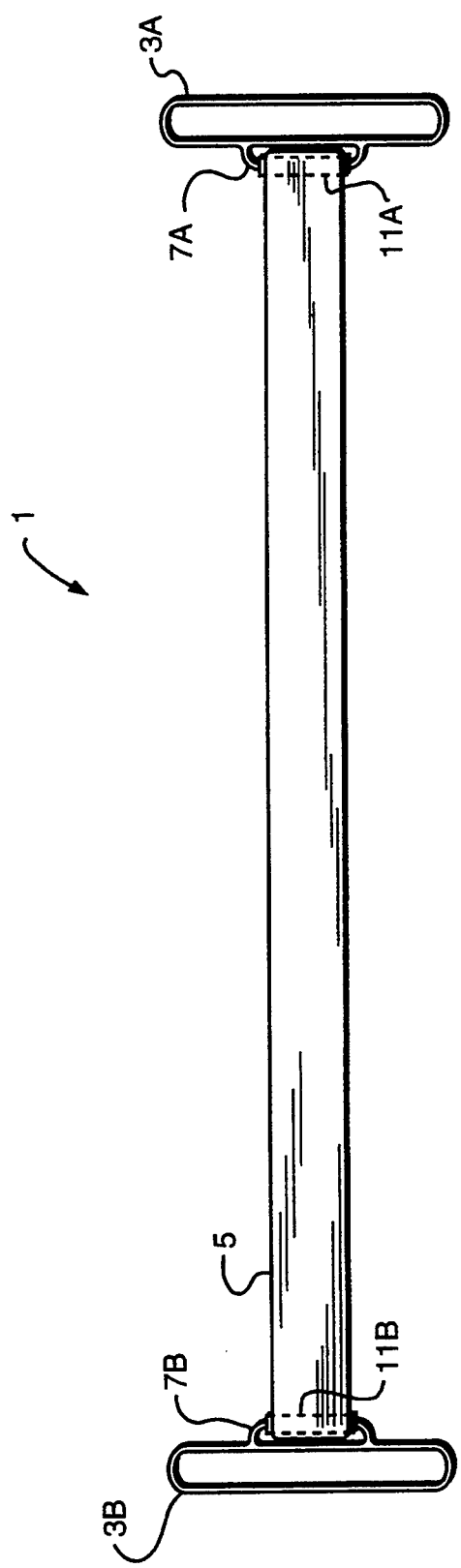
FIG. 1 is a top plan view of one preferred embodiment of the sling of the present invention.
Figure 2:
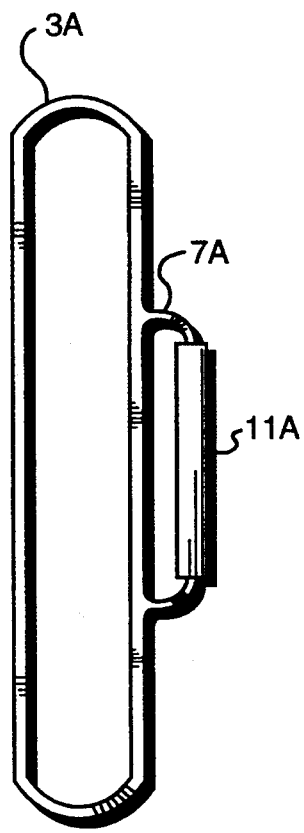
FIG. 2 is a top plan view of a handle of the sling shown in FIG. 1.

While the present invention will hereinafter be described in connection with various embodiments and methods of use, it will be understood by those skilled in the art that it is not intended to limit the invention to these embodiments. On the contrary, it is intended to cover all such alternatives, modifications, and equivalents as may be included within the spirit and broad scope of the invention as defined only by the hereinafter appended claims.

DESCRIPTION OF PREFERRED EMBODIMENTS

FIGS. 1, 2, 4, and 5 illustrate one preferred embodiment 1 of the sling of the present invention. Sling 1 comprises two handles 3A, 3B and strap 5. Handles 3A, 3B preferably are rigid O-shaped or bracket-shaped rings made of metal, or composite materials, and comprise respective U-shaped sleeves 7A, 7B. Of course, other shapes and/or constructions of the handles 3A, 3B are possible without departing from the instant invention. Indeed, one such possible variation of the construction of handles 3A, 3B will be discussed below in connection with FIG. 3.

In this preferred embodiment, cylindrically-shaped rollers 11A, 11B are mounted on sleeves 7A, 7B and are able to rotate about sleeves 7A, 7B. Rollers 11A, 11B are of conventional construction and are preferrably made of metal, composite materials, and/or plastic. It should be appreciated that although the rollers 11A, 11B included in the preferred embodiment presently under discussion are of cylindrical shape, rollers 11A, 11B may take other shapes, and indeed may be eliminated entirely, without departing from the present invention.

Strap 5 has two ends 31A, 31B, which ends 31A, 31B are looped, respectively, through sleeves 7A, 7B and around rollers 11A, 11B, and secured to strap 5. Preferably, strap 5 is made of non-elastic nylon or nylon-containing material, however, other materials may be used without departing from this embodiment of the present invention, so long as certain conditions (which will be discussed more fully hereinafter) are satisfied. Also, alternatively, ends 31A, 31B are removably secured to strap 5 by conventional heavy-duty Velcro TM -type hook and loop fastening means (not shown), or other appropriate means (e.g., ends 31A, 31B may be permanently sewn to strap 5). Advantageously, use of removable Velcro TM -type hook and loop fastening means in sling 1 permits strap 5 to be replaced separately when it becomes worn or otherwise needs to be replaced, rather than necessitating wasteful scraping of the entire sling 1.

Preferably, strap 5 is dimensioned to have a length (i.e., the distance between the sleeves 7A, 7B when the strap is held taught along its entire length between the handles 3A, 3B) that is between 120 and 140 percent of the height of the individual (not shown) using the sling 1. More preferably, the length of the sling is made about 133 percent the height of the individual using the sling. Thus, in order to satisfy this requirement of the preferred embodiment 1, the length of the strap 5 may vary depending upon the height of the individual (not shown) using the sling 1. However, in order to illustrate this feature, if sling 1 is being used by an individual of average height (i.e., 68 inches), then the length of strap 5 is preferably between 81.6 and 95.2 inches, and more preferably is about 92 inches. Advantageously, this feature of the present invention permits the individual using the sling to apply moving-force to the hose while standing essentially erect (but with knees slightly bent), and thus, to predominately employ the individual's leg muscles, rather than the individual's back muscles, to position and/or reposition the hose. Also advantageously, since the length of the strap 5 according to the present invention permits the hose to be dragged along the surface of the ground, most of the weight of the hose is borne by the ground and not by the individual positioning the hose. Thus, the present invention permits easy and rapid positioning of a large-diameter hose, while substantially decreasing risk of injury to the individual positioning the hose.

Figure 4:
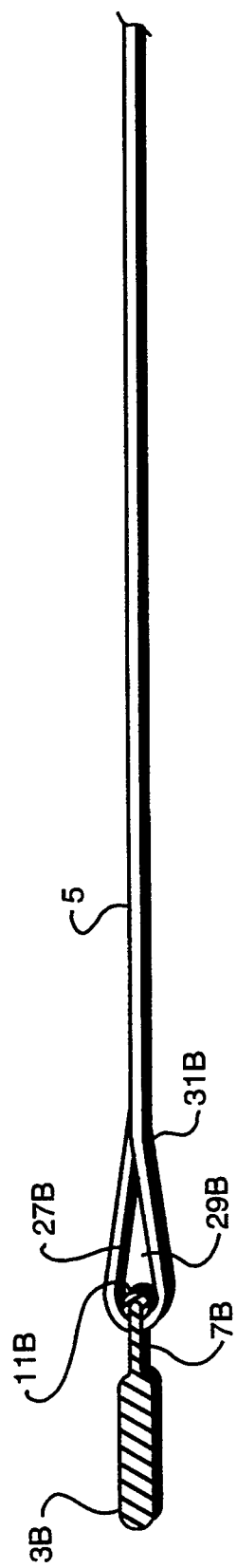
FIG. 4 is a side cross-sectional view of the sling shown in FIG. 1.
Figure 4A:
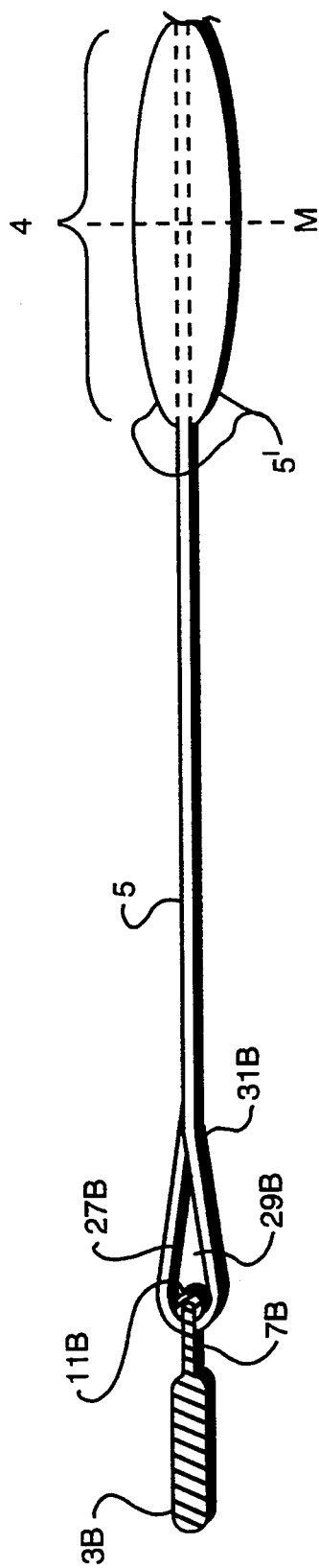
FIG. 4A is a side cross-sectional view of the variant shown in FIG. 1A.

Also preferably, strap 5 has a width substantially equal to the diameter of the hose to be carried by the strap 5. However, in one variation of embodiment 1 shown in FIGS. 1A and 4A, the strap 1 is reinforced at a mid-portion thereof with additional material 5' to strengthen the sling 1 at the point at which the hose is intended to be carried. Preferably, reinforcing of the sling 5 is accomplished by attaching additional material 5' to sling 1 at a mid-portion 4 thereof, either by folding over material of the strap 5 at the mid-portion 4 and stitching (or otherwise permanently attaching) same to the strap 5 (which results in narrowing of the width of the strap 5 in the mid-portion 4 toward the middle M of the strap 5), or by attaching one or more patches of material to strap 5 to increase the strength and thickness of strap 5 at its mid-portion 4. Advantageously, addition of material to strap 5 at the mid-portion 4 thereof strengthens strap 5 at the point where it contacts the hose and helps to prevent the strap 5 from breaking under dragging-stress.

Returning now to the previous discussion of the preferred embodiment 1 of the present invention, in sling 1, loops 27A, 27B delimit void spaces 29A, 29B which permit rotation of the sleeves 7A, 7B in respective loops 27A, 27B. Of course, the amount of void space encompassed in loops 27A, 27B may be varied without departing from the present invention, so long as the amount of void space permits free rotation of rollers 11A, 11B and/or sleeves 7A, 7B in loops 27A, 27B. Advantageously, the ability of sleeves 7A, 7B to rotate in loops 27A, 27B permits an individual using sling 1 to adjust the individual's grip on handles 3A, 3B more easily than would otherwise be possible. Rollers 11A, 11B increase the ability of sleeves 7A, 7B to rotate in loops 27A, 27B.

Figure 3:
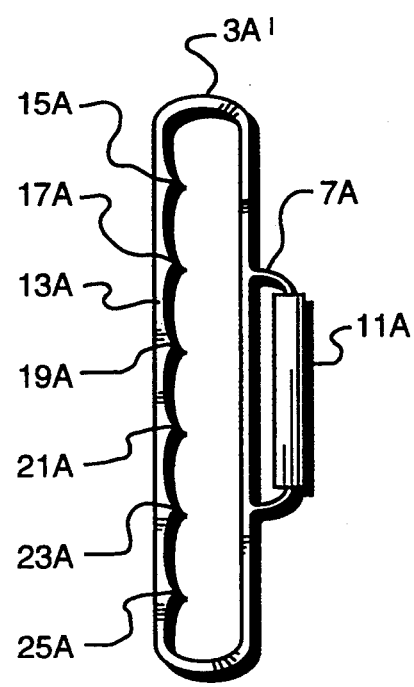
FIG. 3 is a top plan view of a variant of the handle shown in FIG. 2.

FIG. 3 illustrates one variant 3A' of the handles 3A, 3B of sling 1. Although only one handle 3A' is shown in FIG. 3, it will be appreciated that both handles 3A, 3B of the present invention may be constructed according to the variant 3A' shown in FIG. 3. Handle 3A' comprises a conventional metal or plastic pistol-grip-type surface 13A adapted to receive a human hand. Surface 13A is made up of a plurality of ridges 15A . . . 25A defining curved grooves therebetween for receiving the digits of the hand (not shown). Of course, as will be appreciated, variations in the construction of surface 13A may be possible without departing from the present invention. Indeed, surface 13A may be dispensed with entirely, without departing from the present invention.

Figure 5:
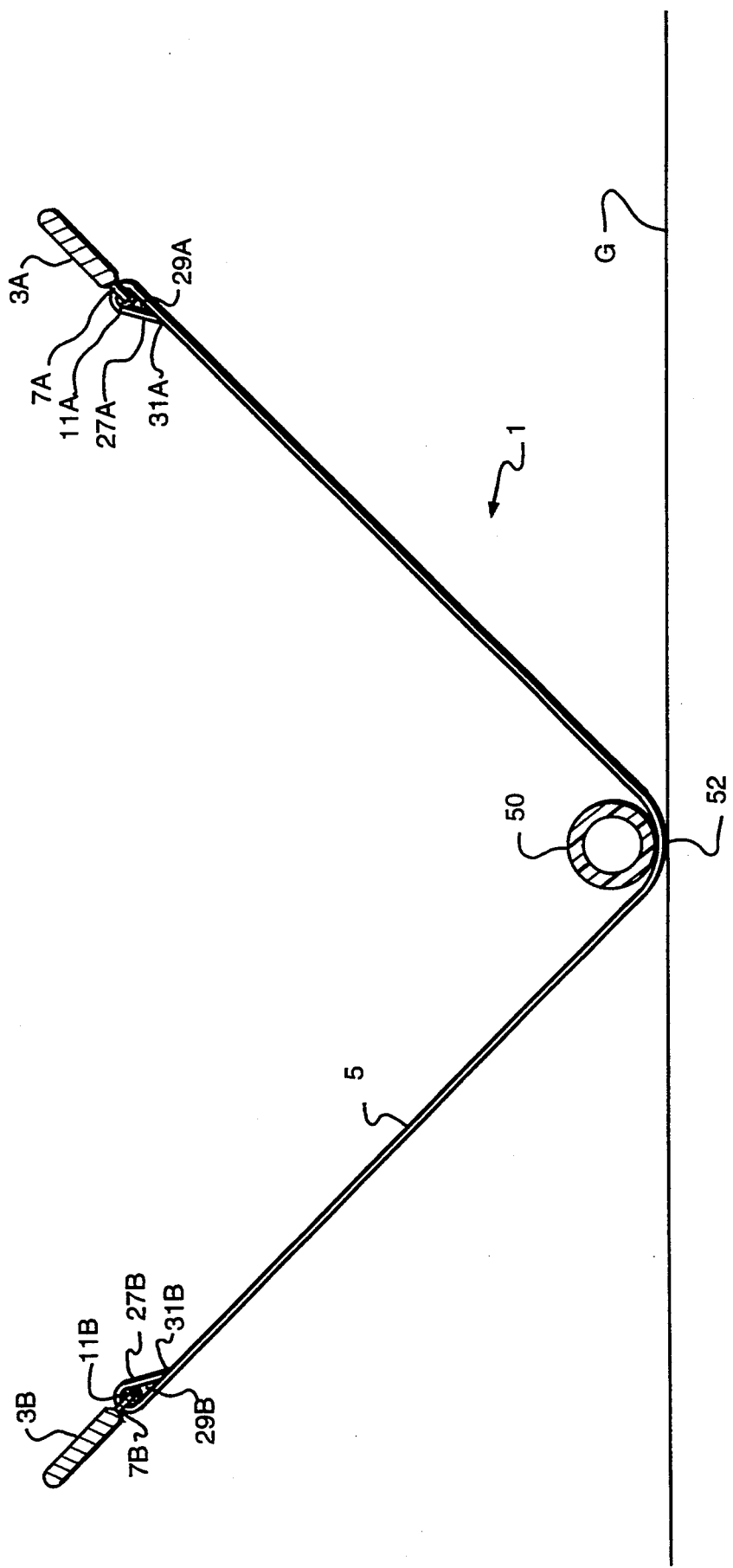
FIG. 5 a side cross-sectional view of the sling shown in FIG. 1, which sling is shown being used to position a large diameter hose, in order to facilitate discussion of a preferred method of using the present invention.

With particular reference now being made to FIG. 5, a preferred method of using sling 1 will presently be discussed. In use, one (for example, 3B) of the two handles 3A, 3B is passed under the lower portion 52 of hose 50 adjacent the ground plane G. Handle 3B is then pulled out from hose 50 so that both handles 3A, 3B are grasped by the user at substantially the same distance above the ground plane G, and so as to loop strap 5 around hose 50. The individual using the sling 1 then grasps both handles 3A, 3B close to the individual's body and walks away from the hose, while standing substantially erect (but with knees slightly bent), toward the position to which it is desired to relocate the hose 50. Thus, advantageously, the present invention permits rapid relocation of the hose 50 while substantially reducing risk of injury to the individual relocating hose 50.

Thus, it is evident that there has been provided in accordance with the present invention, a sling for dragging a fire hose that fully satisfies both the aims and objectives hereinbefore set forth. While the present invention has been described in conjunction with specific embodiments and methods of use, many alternatives, modifications, and variations may be made without departing from the spirit or scope of the present invention. For example, the material making up strap 5 may be chosen so as to have a co-efficient of friction with respect to the hose that permits the hose to be easily maneuvered when it is being dragged by sling 1, but prevents abrasion and/or chafing damage to the hose from rubbing of the strap against the hose. Accordingly, the present invention is intended to embrace all such alternatives, modifications, and variations as may fall within the spirit and broad scope of the appended claims.

I claim:
1. A sling for moving a large-diameter hose, and comprising, two handles, each of said handles (a) including a gripping surface for receiving a human hand, said surface including a plurality of ridges adapted for receiving digits of said hand, and (b) having a respective U-shaped sleeve for holding an elongate, flexible flat strap for carrying said hose, said strap having two ends, said ends being looped through respective sleeves and secured to said strap to form two respective loops of said strap about said sleeves, said loops being dimensioned to permit rotation of said sleeves in said respective loops, said strap having a predetermined length that is between 95 and 160 percent of the height of an individual using said sling, and being reinforced with additional material of said strap attached at a mid-portion of said strap whereby to strengthen said strap at said mid-portion.

2. A sling according to claim 1, and further comprising, two cylindrical rollers mounted on respective sleeves so as to increase ability of said sleeves to rotate in said respective loops.

3. A sling according to claim 1, wherein said handles are made of metal.

4. A sling according to claim 1, wherein said strap is made of nylon.

5. A sling according to claim 1, wherein said strap has a co-efficient of friction with respect to said hose that permits said hose to be maneuvered when dragged by said sling, but substantially prevents abrasion of said hose by said sling.

6. A sling according to claim 1, wherein said ends are sewn to the strap.

7. A sling according to claim 1, wherein said ends are removably secured to said strap by hook and loop fastener means.

8. A sling for dragging a large-diameter fire hose, and comprising, two rigid handles each having a respective gripping surface for receiving a human hand, said surface including a plurality of ridges adapted for receiving digits of said hand, each of said handles also having a respective U-shaped sleeve for holding an elongate, substantially non-elastic flexible flat strap for carrying said hose, said strap having two ends, said ends being looped through respective sleeves and secured to said strap to form two respective loops of said strap about said sleeves, said loops being dimensioned to permit rotation of said sleeves in said respective loops, and wherein:

said strap has a length that is between 120 and 140 percent of the height of an individual using said sling;

said strap has a co-efficient of friction with respect to said hose that permits said hose to be maneuvered when being dragged by said sling, but substantially prevents abrasion of said hose by said sling; and said strap is reinforced with additional material of said strap attached at a mid-portion of said strap whereby to strengthen said strap at said mid-portion.

9. A sling according to claim 8, wherein said ends are sewn to the strap.

10. A sling according to claim 8, wherein said ends are removably secured to said strap by hook and loop fastener means.

11. A sling according to claim 8, wherein the length of said strap is 133 percent the height of said individual.

* * * * *